(12) United States Patent
Weinrotter et al.

(10) Patent No.: US 8,607,755 B2
(45) Date of Patent: Dec. 17, 2013

(54) IGNITION DEVICE FOR A LASER IGNITION OF AN INTERNAL COMBUSTION ENGINE

(75) Inventors: Martin Weinrotter, Stuttgart-Botnang (DE); Pascal Woerner, Stuttgart (DE); Juergen Raimann, Weil der Stadt (DE); Dieter Wolz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 12/737,704

(22) PCT Filed: Jul. 17, 2009

(86) PCT No.: PCT/EP2009/059229
§ 371 (c)(1),
(2), (4) Date: Apr. 27, 2011

(87) PCT Pub. No.: WO2010/015500
PCT Pub. Date: Feb. 11, 2010

(65) Prior Publication Data
US 2011/0203542 A1 Aug. 25, 2011

(30) Foreign Application Priority Data
Aug. 8, 2008 (DE) .......................... 10 2008 041 130

(51) Int. Cl.
*F02P 23/04* (2006.01)
*F02P 23/00* (2006.01)
(52) U.S. Cl.
USPC .................................. 123/143 B; 123/143 R

(58) Field of Classification Search
USPC ................. 123/143 B, 143 R, DIG. 9, 143 C; 431/254; 372/23, 25, 71; 60/776, 60/39.821
See application file for complete search history.

(56) References Cited

U.S. PATENT DOCUMENTS

| | | | |
|---|---|---|---|
| 5,367,869 A | 11/1994 | DeFreitas | |
| 5,628,180 A | 5/1997 | DeFreitas | |
| 2006/0132930 A1* | 6/2006 | Kopecek et al. | 359/718 |
| 2010/0263615 A1 | 10/2010 | Weinrotter et al. | |

FOREIGN PATENT DOCUMENTS

| | | |
|---|---|---|
| AT | 506 343 | 8/2009 |
| DE | 10 2007 041 528 | 3/2009 |
| EP | 1 820 948 | 8/2007 |
| JP | 2007-506031 | 3/2007 |
| WO | WO 2005/066488 | 7/2005 |
| WO | WO 2009/097635 | 8/2009 |

\* cited by examiner

*Primary Examiner* — Mahmoud Gimie
(74) *Attorney, Agent, or Firm* — Kenyon & Kenyon LLP

(57) ABSTRACT

An ignition laser is provided for an internal combustion engine, in which the combustion chamber window is connected to a housing of the ignition laser in a gas-resistant, pressure-resistant, and temperature-resistant manner. Furthermore, a pressure relief bore is present which effectively prevents a pressure increase in the housing of the ignition laser.

7 Claims, 6 Drawing Sheets

IGNITION DEVICE FOR A LASER IGNITION OF AN INTERNAL COMBUSTION ENGINE

BACKGROUND OF THE INVENTION

1. Field of the Invention

The present invention relates to an ignition device for providing laser ignition of an internal combustion engine.

2. Description of Related Art

A so-called laser ignition is known from published international PCT patent application WO 2005/066488 A1. This laser ignition includes an ignition laser, which extends into the combustion chamber of an internal combustion engine. The ignition laser is optically pumped by a pumping light source via a fiber optic guide.

At one end of the ignition laser facing the combustion chamber, there is a so-called combustion chamber window, which is able to transmit the laser beams generated for the ignition laser. This combustion chamber window has to be accommodated in a sealing manner in a housing of the ignition laser. There are high requirements on the sealing between the combustion chamber window and the housing, because during the operation of the internal combustion engine surface temperatures of more than 600° C. may occur at the combustion chamber window. In addition, there may also be intermittent pressure loads of up to ca. 250 bar. When an ignition laser is used for igniting a gas turbine, it is true that slight pressures prevail in the combustion chamber of the gas turbine, but the surface of the combustion chamber window may reach up to 1,000° C., and uncontrolled ignition by incandescence having to be controlled in every case.

It is clear that the inside of the ignition laser has to be reliably sealed from the extremely high temperatures and pressures. If exhaust gases should happen to reach the inside of the ignition laser, this would lead to failure of the ignition laser.

From post-published German patent application document DE 102007041528.3, an ignition laser is known in which the combustion chamber window and the housing are sealed in such a way that, over the entire service life of the internal combustion engine, and at the pressures and temperatures prevailing in the combustion chamber of an internal combustion engine, a secure and reliable seal of combustion chamber window and housing are ensured.

BRIEF SUMMARY OF THE INVENTION

An object of the present invention is providing an ignition laser having an additionally improved service life and reliability.

According to the present invention, this object is attained for a laser ignition device for an internal combustion engine including a laser-active solid, a combustion chamber window and a housing having an inner sleeve and an outer sleeve, the inner sleeve and the outer sleeve bordering on an intervening space, in that the housing has a pressure-equalization device, and the pressure-equalization device connects the intervening space and the environment to each other.

The pressure-equalization device according to the present invention is intended, so to speak, as a backup system for the sealing concept of the laser ignition device. For if, during operation of the laser ignition device, only minimal leakages should occur, this may lead to the pressure in the intervening space rising clearly above the environmental pressure, and as a result greatly stressing the sealing surface between the combustion chamber window and the inner sleeve of the housing. It is ensured by the pressure-equalization device according to the present invention that, even at small minimum leakage flows between the outer housing and the combustion chamber window, the sealing surface between the combustion chamber window and the inner sleeve is not stressed in an inadmissible manner, so that the inside of the housing is protected reliably from combustion gases and the pollutants contained in the combustion gases.

Because of the pressure-equalization device according to the present invention, the sealing of the inside of the housing is still maintained even if the first-mentioned sealing surface, which is, in the nature of things, exposed to higher thermal and chemicals stresses, should begin to leak in the course of operating duration of the internal combustion engine, or of the laser ignition device. Because of the pressure-equalization device according to the present invention, an exhaust gas quantity, flowing into the intervening space between the outer sleeve and the combustion chamber window, based on a leakiness, is able to be carried off. As a result, the pressure in the intervening space does not rise, and the operating conditions of the second seal between the combustion chamber window and the inner sleeve do not change. An inadmissible pressure application to the intervening space is also avoided.

A very simple variant, from a standpoint of production engineering, of a pressure device according to the present invention is developed as a pressure-equalization bore, that is applied to the outer sleeve. The pressure-equalization bore, in this context, is positioned on the outer sleeve in such a way that the pressure-equalization bore, in the installed state of the laser ignition device, opens out onto a shaft in which the laser ignition device is mounted. This shaft corresponds to the so-called plug shaft in the cylinder head of usual internal combustion engines in which the ignition is triggered by a spark plug.

In order to prevent pollutants from being able to get through the pressure-equalization bore, from the shaft mentioned, into the intervening space between the outer sleeve and the inner sleeve, it is further provided that the pressure-equalization bore, at its exit at the housing, has a minimum diameter, and that the diameter increases in the direction of the intervening space. Thus it is possible, for example, to design the pressure-equalization bore as a stepped bore or as a cylindrical bore, and subsequently partially to reduce the diameter of the pressure-equalization bore at the outside diameter of the outer surface.

Furthermore, it is also possible to accommodate a filter element in the pressure-equalization bore. This filter element has the task of preventing the penetration of particles and other contaminations, and may be produced, for example, of a temperature-resistant foam, be it of plastic, metal or a sintered material. Moreover, it is also possible to develop the filter element as a wire grid or another type of texture.

A further advantageous embodiment of the present invention provides closing the pressure-equalization bore by a stopper made of a curable plastic, for instance, which takes over the function of a seal. An especially suitable material is polyimide, based on its high temperature stability. One additional suitable material is silicone, based on its high gas permeability, but being impermeable to particles and liquids.

By closing the pressure-equalization bore using a stopper, it is first of all ensured that, in normal operation, i.e. when the seal between outer sleeve and combustion chamber window is completely tight, the pressure-equalization bore is closed, and consequently, no contamination is able to get into the intervening space. If, however, the pressure in the intervening space rises, for instance, to 4 bar above the environmental pressure, the stopper is squeezed out of the pressure-equalization bore by these pressure forces, and the pressure-equalization bore makes possible a pressure equalization between the intervening space and the environment. This assures that no inadmissibly high pressures are able to occur in the intervening space.

An additional advantageous embodiment of the present invention provides that the pressure-equalization device be developed as a pressure relief groove which is preferably applied at a male thread and/or a female thread of the housing of the laser ignition device. This pressure relief groove is preferably applied in the axial direction, so that the pressure relief groove ends at the end of the laser ignition device that is at a distance from the combustion chamber window, and ends with the latter.

Because of the separation of the housing into an inner sleeve and an outer sleeve, one may also achieve a constructive embodiment of the outer sleeve and the inner sleeve that are each adapted optimally to their respective tasks. By the choice of various materials for the outer sleeve and the inner sleeve, it is also possible to provide an additionally optimized ignition laser. Alternatively it is possible to combine a diaphragm as a continuous material with the outer sleeve and the combustion chamber window, or with the inner sleeve and the combustion chamber window.

DETAILED DESCRIPTION OF THE INVENTION

Figure 1A:
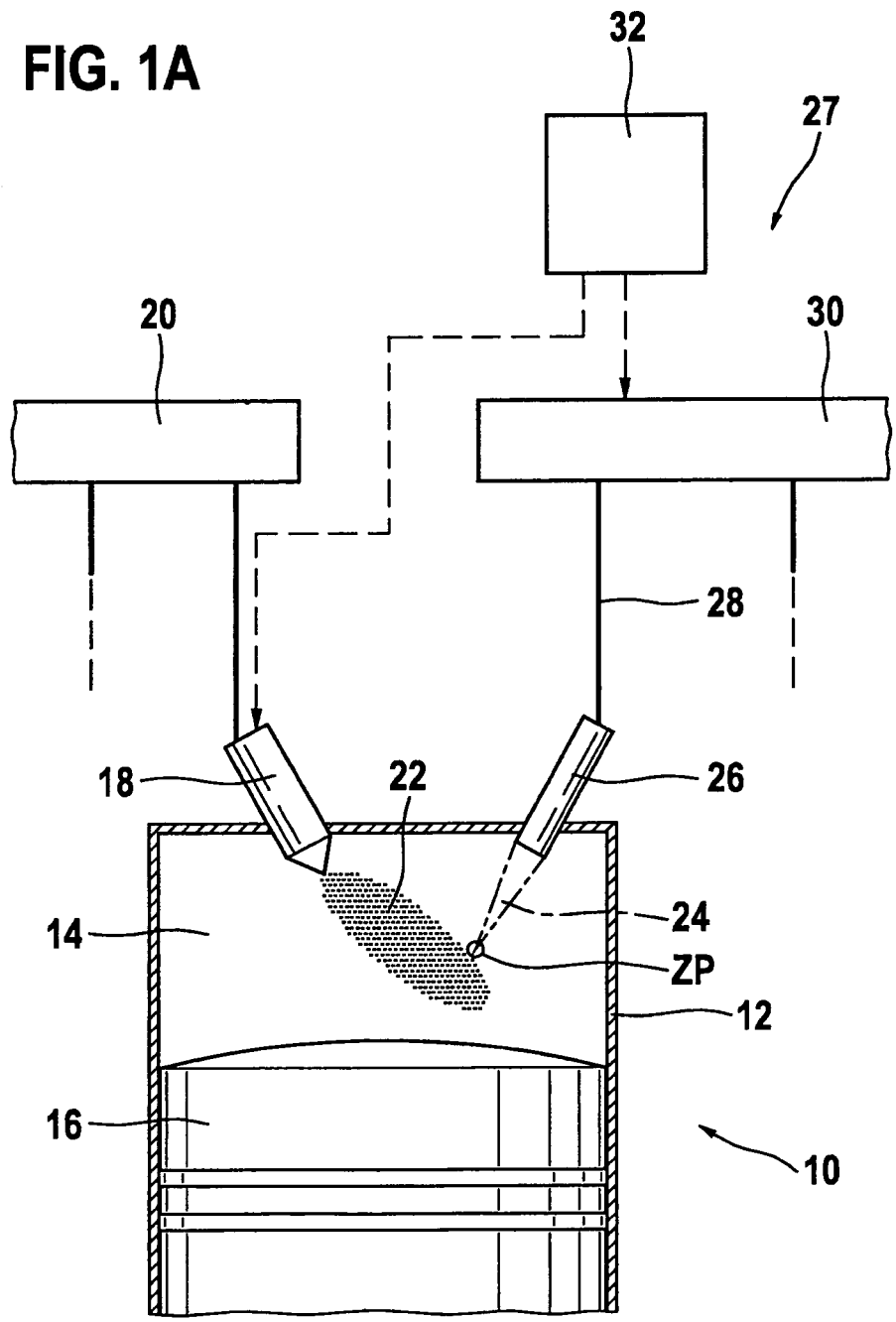
FIG. 1a shows a schematic representation of an internal combustion engine having a laser-based ignition device.

In FIG. 1a, the entire internal combustion engine is denoted by reference numeral 10. It may be used for driving a motor vehicle that is not shown. Internal combustion engine 10 usually includes multiple cylinders, only one of which is designated in FIG. 1 by reference numeral 12. A combustion chamber 14 of cylinder 12 is bounded by a piston 16. Fuel reaches combustion chamber 14 directly through an injector 18, which is connected to a fuel pressure reservoir 20 that is also designated as a rail. Alternatively the fuel-air mixture may also be formed outside of combustion chamber 14, for instance, in the intake manifold.

Fuel-air mixture 22 inside combustion chamber 14 is ignited by a laser pulse 24, which is radiated into combustion chamber 14 by an ignition device 27 which includes an ignition laser 26. For this purpose, laser device 24 is fed, via a light-guide device 28, with a pumping light provided by a pumping light source 30. Pumping light source 30 is controlled by a control unit 32, which is also able to control injector 18.

Figure 1B:
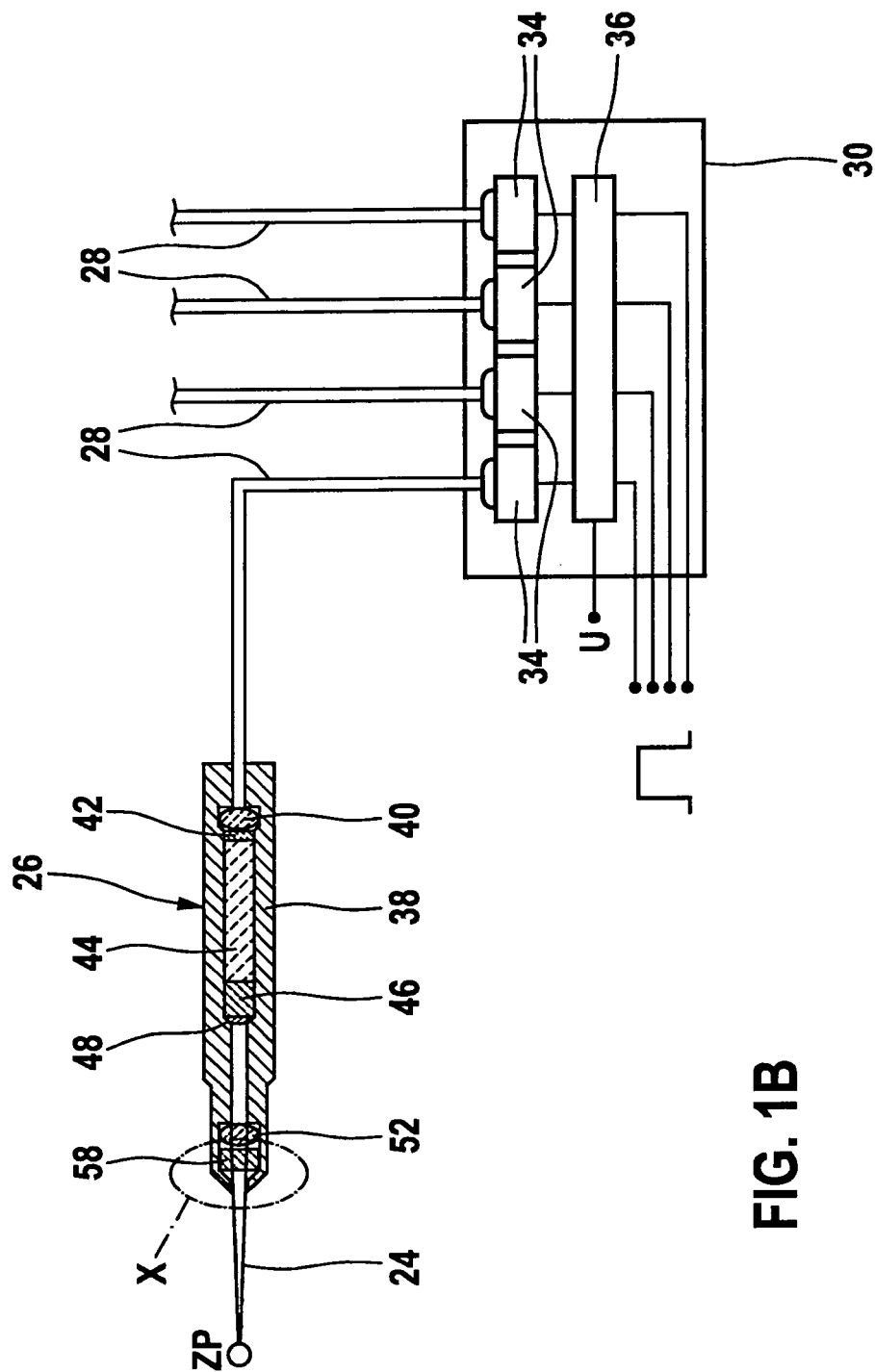
FIG. 1b shows a schematic representation of the ignition device in FIG. 1.

As may be gathered from FIG. 1b, pumping light source 30 feeds multiple light guide devices 28 for different ignition lasers 26, which are respectively associated with one cylinder 12 of internal combustion engine 10. Toward this end, pumping light source 30 has multiple individual laser light sources 34, which are connected to a pulsed current supply 36. Because of the presence of the plurality of individual laser light sources 34, a quasi "latent" distribution of pumping light to the various laser devices 26 is achieved such that no optical distributors or the like are required between pumping light source 30 and ignition lasers 26.

Ignition laser 26 has, for example, a laser-active solid 44 having a passive Q-switch 46, which, in conjunction with a coupling mirror 42 and a decoupling mirror 48 forms an optical resonator. When supplied with pumping light generated by pumping light source 30, ignition laser 26 generates a laser pulse 24 in a manner known per se, which is focused by focusing optics 52 on an ignition point ZP situated in combustion chamber 14 (FIG. 1a). The components located in housing 38 of ignition laser 26 are separated from combustion chamber 14 by a combustion chamber window 58.

Figure 2:
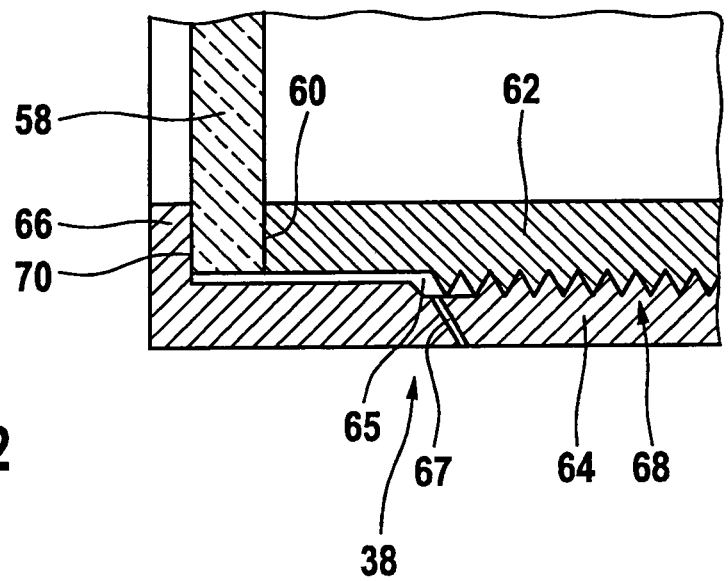
FIGS. 2-7 show exemplary embodiments of ignition lasers according to the present invention.

FIG. 2 shows detail X from FIG. 1b in a partial longitudinal section, considerably enlarged. In this exemplary embodiment, housing 38 is developed in two parts. It includes an inner sleeve 62 and an outer sleeve 64. Outer sleeve 64 has a shoulder 66 at one end facing combustion chamber 14 (see FIG. 1a). Shoulder 66 has essentially two functions. First, it screens a part of combustion chamber window 58 from the combustion chamber and the pressures and temperatures prevailing there, so that the thermal stress of combustion chamber window 58 is reduced.

Furthermore, with the aid of shoulder 66 it is possible to press combustion chamber window 58 against inner sleeve 62 and thereby to increase the tightness in joints 60 and 70. For this purpose, a female thread is provided on outer sleeve 64, which collaborates with a corresponding male thread of inner sleeve 62. This threaded arrangement, made up of a female thread and a male thread, is designated in its entirety by reference numeral 68. Furthermore, instead of the threaded arrangement, inner sleeve 62 may be pressed onto outer sleeve 64 using a specified contact pressure, and the connection may be produced by welding or another continuous-material method or according to a force-locking or form-locking method (flanging).

Alternatively to the example embodiment described of a continuous material connection of window and sleeve, the sealing effect may be produced by clamping. In this case the surfaces having reference numerals 60 and 70 are the sealing surfaces.

Combustion chamber window 58 is connected in a continuous material manner to an end face (not having a reference numeral) of inner sleeve 62 of housing 38. The joint is provided in FIG. 2 with reference numeral 60. The continuous material connection between combustion chamber window 58 and housing 38 may take place by soldering, especially hard soldering, soft soldering, adhesion, glazing or welding. In the exemplary embodiment shown in FIG. 2, housing 38 preferably has a coefficient of thermal expansion which comes close to the coefficient of thermal expansion of combustion chamber window 58. This avoids thermal stress and unloads joint 60, as a result. At the same time, however, one should be careful that housing 38 is made of a heat-resistant material, and as a result, also has a sufficient fatigue resistance at the operating temperatures prevailing in the combustion chamber. The low installation space required is particularly advantageous in this embodiment variant.

In the example embodiment shown in FIG. 2, all the pressure forces are transmitted via joint 60 of combustion chamber window 58 in housing 38, or inner sleeve 62 of housing 38.

Because of the separation of housing 38 into an inner sleeve 62 and an outer sleeve 64, more degrees of freedom are available to the designer for the functionally optimized design of the two components named and joint 60. Thus, the material of outer sleeve 64, for instance, may be optimized with respect to heat resistance and fatigue resistance, while the material of inner sleeve 62 is selected in such a way that its coefficient of thermal expansion corresponds to as great an extent possible to the coefficient of thermal expansion of combustion chamber window 58, if a continuous material connection is preferred. If a force-locking connection is selected, different coefficient of thermal expansion may be compensated for at least partially. As a result, the thermal stresses are reduced and joint 60 is unloaded. Moreover, it is naturally also possible to select the material of inner sleeve 62 in such a way that the continuous material connection claimed according to the present invention between combustion chamber window 58 and inner sleeve 62 is able to be designed as securely, simply, and durably as possible.

Because of the strain of outer sleeve 64 and inner sleeve 62, a sealing surface 70 is created between shoulder 66 and the combustion chamber window, which thus represents a redundant seal that is, so to speak, upstream of joint 60, and which therefore already effects a complete separation of combustion chamber 14 and the inside of ignition laser 26, or at least reduces the temperature stress and the pressure stress of joint 60, and unloads joint 60 as a result.

In order to optimize the sealing surface with respect to its sealing effect, it may be advantageous, for example, to provide shoulder 66 or combustion chamber window 58 with a coating of a ductile metal, such as copper, in the region of sealing surface 70. Because of this, the smallest unevenesses of the contact surfaces between combustion chamber window 58 and outer sleeve 64 are straightened out and the sealing effect is improved. This coating may have a thickness such as 5 μm to 100 μm.

Alternatively, it would also be possible to exchange the positions of joint 60 and sealing surface 70. This would mean that combustion chamber window 58 is connected to shoulder 66 of outer sleeve 64 as continuous material, and that combustion chamber window 58 is pressed against the end face of the inner sleeve in a sealing manner. However, in this context, one should take into account that the thermal load in the area of the contact surface between shoulder 66 and combustion chamber window 58 is greater than between combustion chamber window 58 and inner sleeve 62.

Inner sleeve 62, outer sleeve 64 and combustion chamber window 58 border on an intervening space 65. If sealing surface 70 between shoulder 66 and combustion chamber window 58 is completely tight, the pressure in intervening space 65 remains approximately equal to the environmental pressure.

FIG. 2 shows a first exemplary embodiment of a pressure relief device according to the present invention, in the form of a pressure relief bore 67. This pressure relief bore 67 connects the outer part of outer sleeve 64 to intervening space 65, which is bordered essentially by outer sleeve 64 and inner sleeve 62. Pressure relief bore 67 is distanced axially from combustion chamber window 58, so that, in the laser ignition device, pressure relief bore 67 opens out, not into the combustion chamber, but into a shaft of the cylinder head of the internal combustion engine (not shown), in which the laser ignition device is installed. In usual internal combustion engines, this shaft corresponds to the known plug hole into which the spark plug is installed and fastened in the cylinder head via the plug thread.

Figure 3:
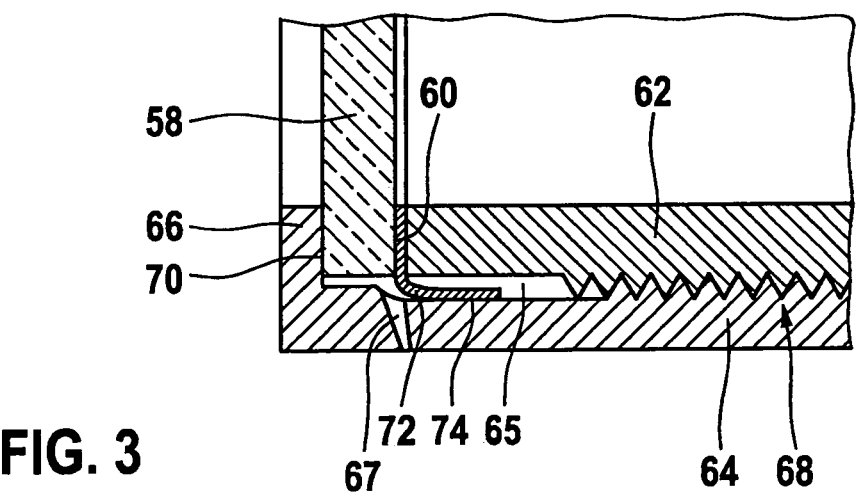

In the exemplary embodiment shown in FIG. 3, a diaphragm 72 is provided which, at one end, is connected as continuous material to combustion chamber window 58 in the area of joint 60. At its other end it is connected as continuous material to outer sleeve 64. This second joint is provided in FIG. 3 with reference numeral 74. With its side facing away from the combustion chamber window, diaphragm 72 lies on inner sleeve 62 and is pressed against inner sleeve 62 additionally by the pressure prevailing in combustion chamber 14 and by the strain of inner sleeve 62 with respect to outer sleeve 64. A gas-tight connection between diaphragm 72 and inner sleeve 62 is not required in the area of joint 60, since the diaphragm is connected in a gas-tight manner at its other end, at second joint 74, to outer sleeve 64.

In FIG. 3, the pressure relief bore is developed to be a frustoconically shaped bore, whose minimal diameter is present at the outer diameter of outer sleeve 64. This prevents the penetration of dirt particles from the outside into intervening space 65. At the same time, production expenditure and flow resistance are also reduced. It is also possible to develop pressure relief bore 67 as a stepped bore (not shown), or locally to narrow down the pressure relief bore at the outer diameter of outer sleeve 64 after production has taken place, by a reshaping process or an upset process, so that, in this way, too, the penetration of contamination and other particles into the intervening space is effectively suppressed.

If the cross section of the pressure relief device has a diameter of approximately 0.1 to 0.3 mm, leakage quantities, which occur at sealing surface 70 between shoulder 66 and combustion chamber window 58, may be carried off. If this seal fails totally, however, so that large pressure impulses get into intervening space 65, the opening of the through hole bore has to have an opening cross section of several square millimeters in size.

Figure 4:
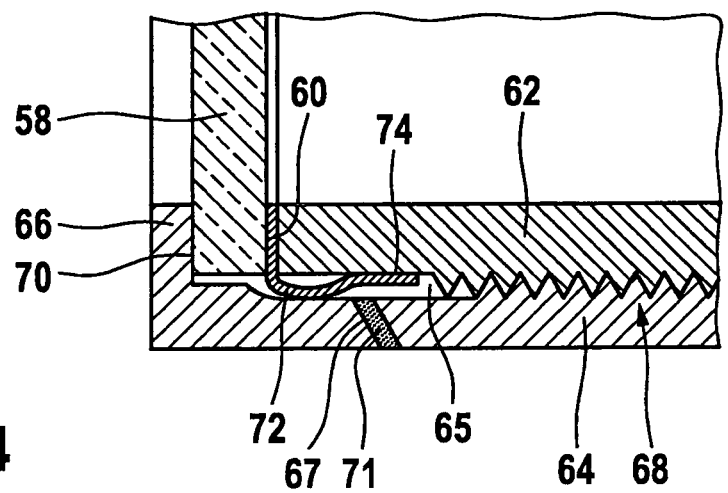

In the exemplary embodiment shown in FIG. 4, diaphragm 72 is connected to inner sleeve 62 in the area of second joint 74. Because of that, too, the use of diaphragm 72 leads to the relative motions between combustion chamber window 58 and housing 38 being able to be balanced without greater mechanical strains, with respect to the materials, and a degree of freedom is obtained in the selection of the materials of inner sleeve 62, outer sleeve 64 and diaphragm 72. FIG. 4 shows an exemplary embodiment of a pressure relief bore 67 according to the present invention, in which the pressure relief bore is set into pressure relief bore 67 through a filter cartridge 71. The filter cartridge may be made of an open-pore foam of plastic, ceramic or even of metal wires or a metal web. The main task of filter element 71 is to prevent the penetration of contaminations into the intervening space.

Figure 5:
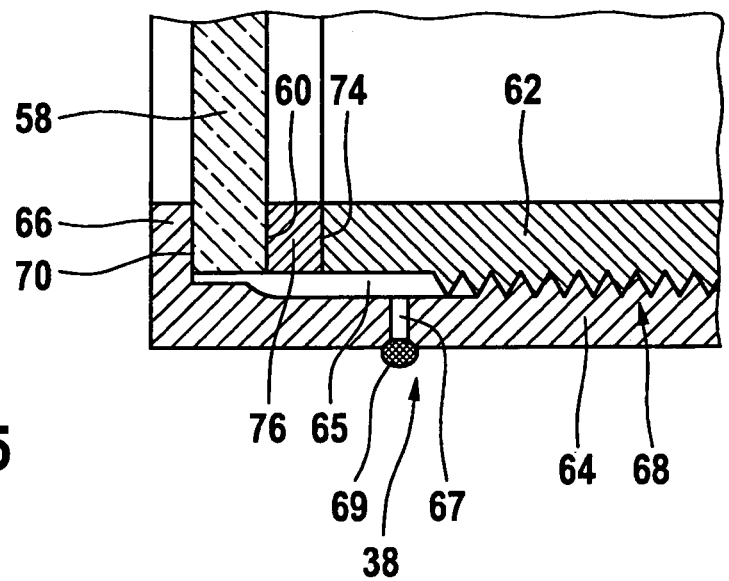
Figure 6A:
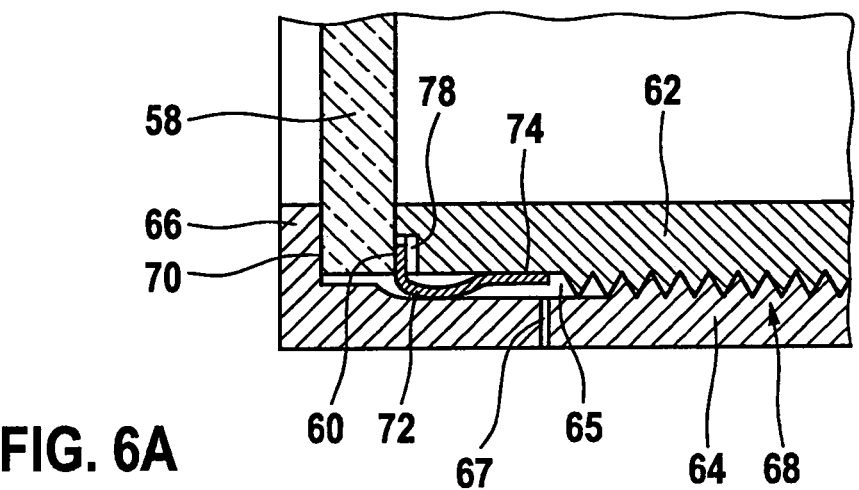
Figure 6B:
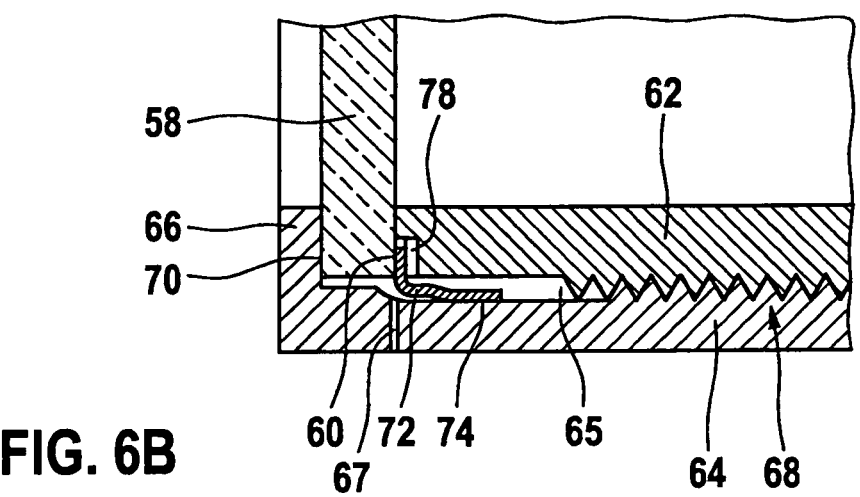
Figure 6C:
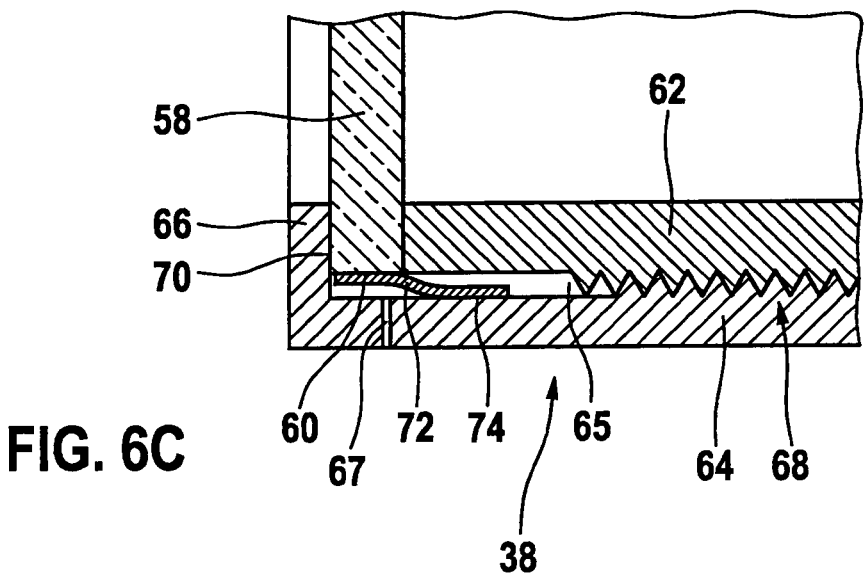

In FIG. 5, pressure relief bore 67 is closed by a stopper 69. This stopper 69 may be formed by a heat sealant or another type of adhesive. Stopper 69 ensures that, in normal operation, no exchange takes place between intervening space 65 and the environment. Only when an admissible maximum pressure in intervening space 65 is exceeded, the gaseous forces, which act on stopper 69 through the pressure relief bore, push it out of bore 67, and the pressure relief bore becomes free. In exemplary embodiments according to FIGS. 6a to 6c, additional configurations of inner sleeve 62, outer sleeve 64 and pressure relief bore 67 are shown.

Figure 7:
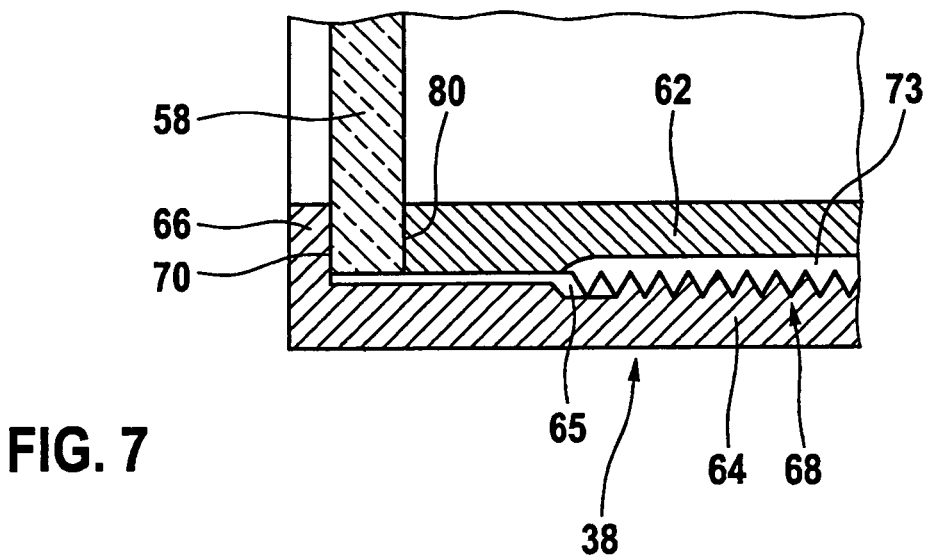

FIG. 7 shows a further exemplary embodiment of a pressure relief device according to the present invention. In this embodiment, a longitudinal groove 73 is milled into the male thread of inner sleeve 62, which makes possible a controlled pressure equalization between intervening space 65 and the environment. Naturally, it is also possible to insert a longitudinal groove (not shown) into the female thread of outer sleeve 64.

What is claimed is:

1. A laser ignition device for an internal combustion engine, comprising:
   a laser-active solid;
   a combustion chamber window; and
   a housing having a pressure-equalization device, an inner sleeve and an outer sleeve, wherein the inner sleeve and the outer sleeve border on an intervening space, and wherein the pressure-equalization device connects the intervening space and an environment to each other.

2. The laser ignition device as recited in claim 1, wherein a pressure-equalization bore is provided in the outer sleeve, and wherein the pressure-equalization bore has a point of exit from the housing at a distance from the combustion chamber window.

3. The laser ignition device as recited in claim 2, wherein the pressure-equalization bore has a varying diameter starting with the smallest diameter at the point of exit from the housing and increasing in the direction towards the intervening space.

4. The laser ignition device as recited in claim 2, wherein a filter element is provided in the pressure-equalization bore.

5. The laser ignition device as recited in claim 2, wherein the pressure-equalization bore is closed by a stopper, and wherein the stopper includes one of polyimide or silicone.

6. The laser ignition device as recited in claim 2, wherein the outer sleeve has a shoulder at an end facing a combustion chamber, and the shoulder partially covers the combustion chamber window.

7. The laser ignition device as recited in claim 6, wherein the outer sleeve has a female thread at an end facing away from the combustion chamber, and wherein the inner sleeve has a male thread cooperating with the female thread of the outer sleeve, and wherein a pressure relief groove is provided in at least one of the female thread and the male thread.

* * * * *

UNITED STATES PATENT AND TRADEMARK OFFICE
CERTIFICATE OF CORRECTION

PATENT NO. : 8,607,755 B2  Page 1 of 1
APPLICATION NO. : 12/737704
DATED : December 17, 2013
INVENTOR(S) : Weinrotter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Twenty-second Day of September, 2015

Michelle K. Lee
*Director of the United States Patent and Trademark Office*